(12) United States Patent
Sandberg et al.

(10) Patent No.: US 6,413,668 B1
(45) Date of Patent: Jul. 2, 2002

(54) LITHIUM ION BATTERY AND CONTAINER

(75) Inventors: Murray G. Sandberg; Morgan Rey Benson, both of Indianapolis, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/480,803

(22) Filed: Jan. 10, 2000

(51) Int. Cl.⁷ .............................................. H01M 2/02
(52) U.S. Cl. ....................... 429/174; 429/166; 429/176; 429/185; 429/210
(58) Field of Search ................................ 429/174, 166, 429/176, 185, 210

(56) References Cited

U.S. PATENT DOCUMENTS

| | | | | |
|---|---|---|---|---|
| 5,254,415 A | * | 10/1993 | Williams et al. | 429/153 |
| 6,004,692 A | * | 12/1999 | Muffoletto et al. | 429/163 |
| 6,224,640 B1 | * | 5/2001 | Tucholski | 29/623.2 |

* cited by examiner

Primary Examiner—Hoa Van Le
(74) Attorney, Agent, or Firm—Margaret A. Dobrowitsky

(57) ABSTRACT

Described is a substantially sealed lightweight lithium ion battery and container comprising:

- a metallic housing having front and back segments, which segments are substantially equal in length and width and a pair of sides having a length substantially equal to the length of the front and back segments;
- a lithium ion battery comprised of a stack of lithium ion electrodes sized to fit snuggly within the housing which battery has bipolar electrodes with an electrolyte there between;
- a housing bottom member sized to snuggly fit the cathode terminal of the lithium electrode stack therein;
- a housing top member sized to snuggly fit the anode terminal of the lithium stack therein; and
- an insulated gasket spaced between the anode and the metallic housing electrically separating the anode from the housing.

11 Claims, 2 Drawing Sheets

LITHIUM ION BATTERY AND CONTAINER

FIELD OF THE INVENTION

The present invention pertains to a lightweight lithium ion battery. In particular, it pertains to a compact lithium ion battery.

BACKGROUND OF THE INVENTION

Lithium batteries are seen by many to be an attractive energy storage device. Lithium ion batteries have been targeted for various applications such as portable electronics, cellular phones, power tools, electric vehicles, and load-leveling/peak-shaving. The batteries are currently replacing many other traditional power sources such as lead acid batteries, nickel cadmium batteries, and nickel metal hydride batteries. Lithium ion batteries have been known for many years (see the *Handbook of Batteries,* David Linden, editor, second edition by McGraw-Hill, copyright 1995, in particular, chapters 36 and 39). Various aspects of lithium batteries have been described in a variety of U.S. Patents, such as U.S. Pat. No. 5,961,672 pertaining to a stabilized anode for lithium polymer batteries. U.S. Pat. No. 5,952,126 pertains to polymer solid electrolyte and lithium secondary cells. U.S. Pat. No. 5,900,183 pertains to polymer electrolytes as well as does U.S. Pat. No. 5,874,185. U.S. Pat. No. 5,849,434 describes non-aqueous electrolyte lithium secondary batteries. Other variations on lithium batteries are described in U.S. Pat. Nos. 5,853,914 and 5,773,959.

Appropriately packaging lithium ion batteries is particularly difficult in the automotive environment due to the need for corrosion resistance, crush and crash worthiness, and vibration resistance. The problems of such batteries can be characterized as a need for better seal robustness, namely overcome leak potential from internal pressure; better packaging robustness, namely better crush/crash worthiness; better thermal exchange properties, namely ability to dissipate heat and receive cooling more effectively; ease of processing and transitioning into mass production, that is, processes that lend themselves to automation.

It is an object of the present invention to provide a lithium ion battery wherein bipolar electrodes are utilized with a lithium ion permeable plastic separator there between, and the cell electrodes being electrically connected appropriately to the anode and cathode terminals which are at opposite ends of the housing for the battery.

SUMMARY OF THE INVENTION

Described is a substantially sealed lightweight lithium ion battery and container comprising:
a metallic housing having front and back segments, which segments are substantially equal in length and width and a pair of sides having a length substantially equal to the length of the front and back segments;
a lithium ion battery comprised of a stack of lithium ion electrodes sized to fit snuggly within the housing which battery has bipolar electrodes with an electrolyte there between;
a housing bottom member sized to snuggly fit the cathode terminal of the lithium ion electrode stack therein;
a housing top member sized to snuggly fit the anode terminal of the lithium stack therein; and
an insulated gasket between the anode and the metallic housing electrically separating the anode from the housing.

DESCRIPTION OF PREFERRED EMBODIMENTS

Figures 1, 2:
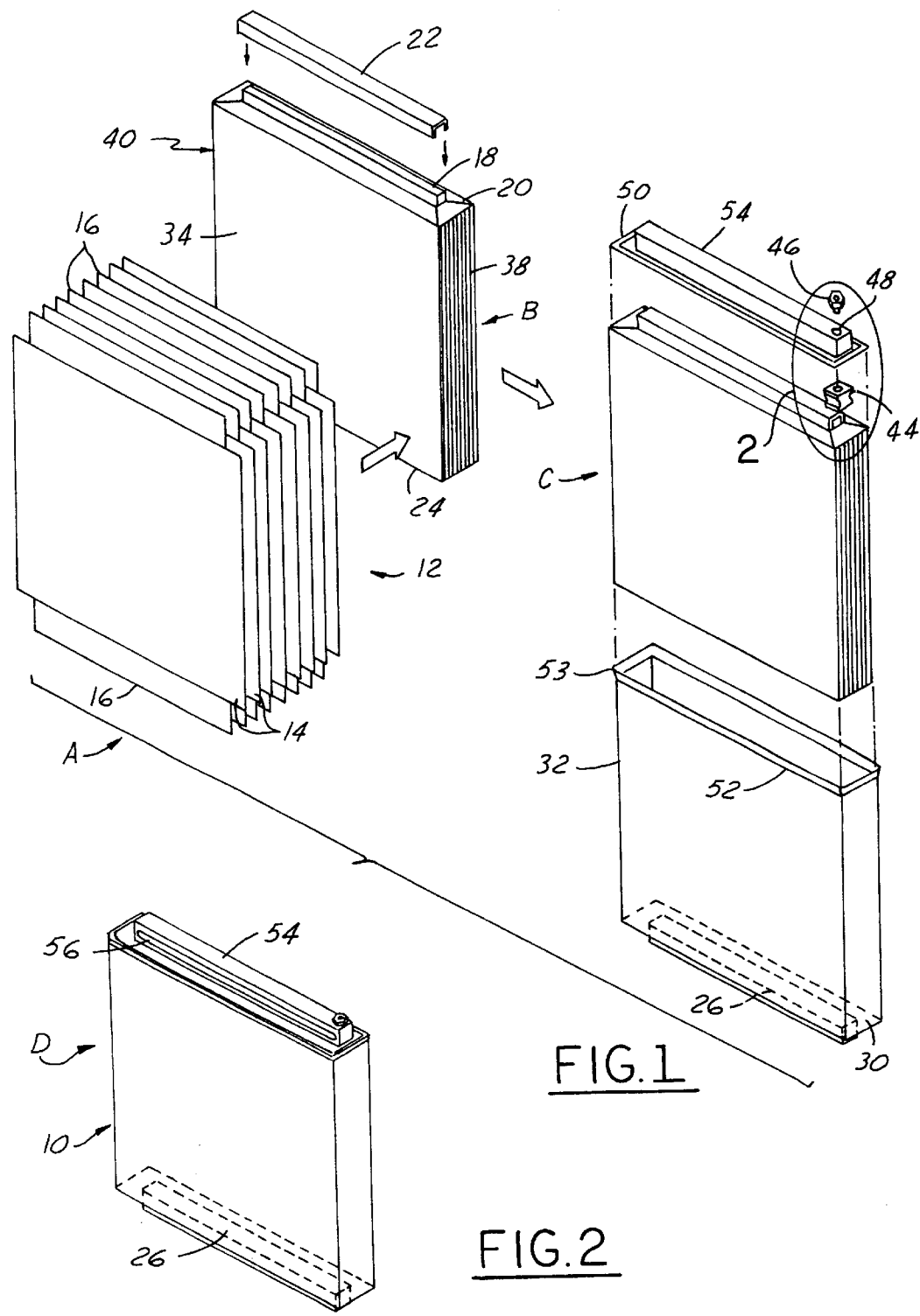
FIG. 1 is a schematic representation of the process of preparing and assembling the bipolar cells into a compact lithium ion battery.
FIG. 2 is the completed compact lithium ion battery.
Figure 3:
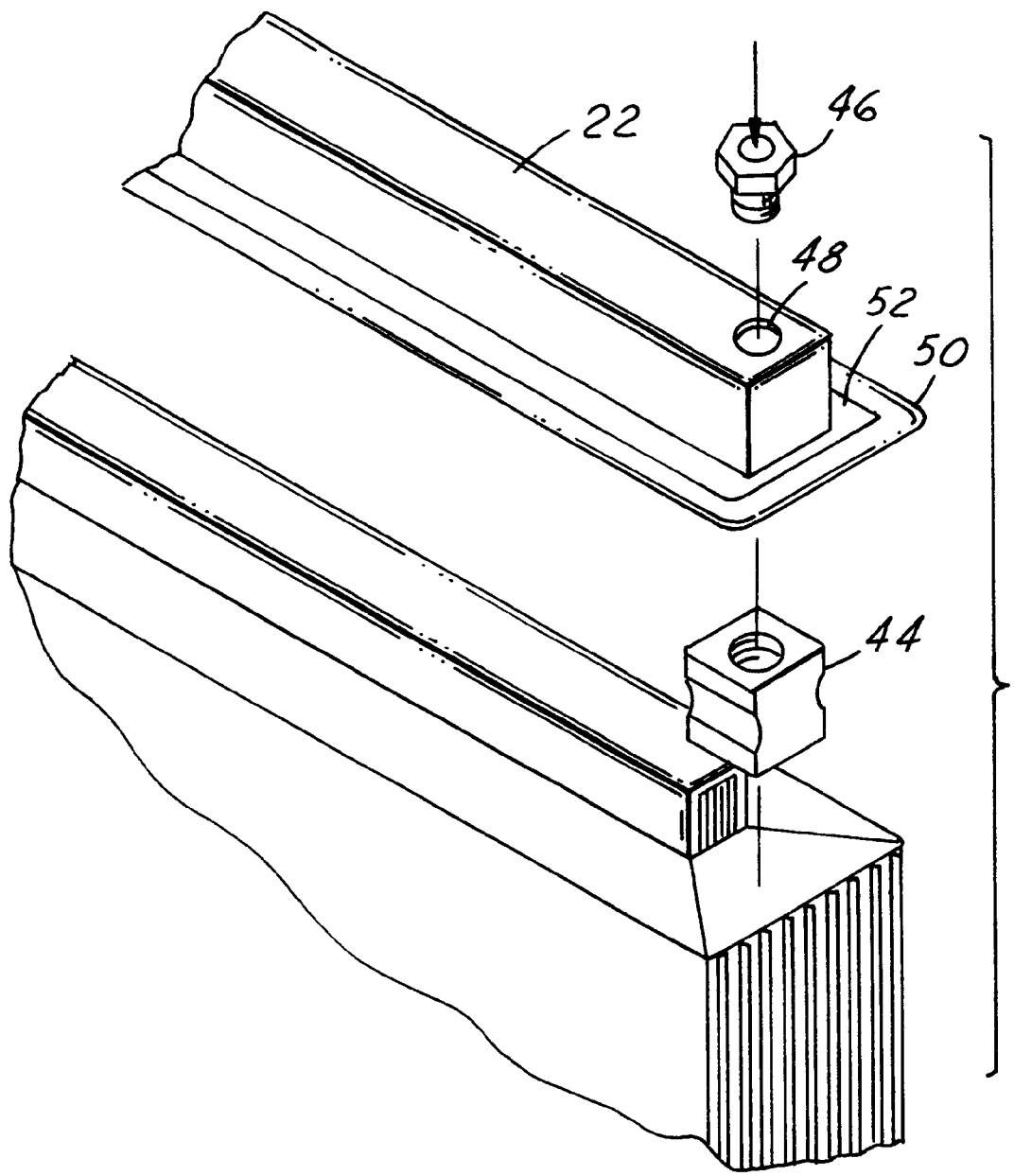
FIG. 3 is a schematic representation of the port utilized for the electrolyte insertion into the battery stack and for release of gas from the battery stack.

The substantially sealed lightweight lithium ion battery 10 of the present invention is manufactured by the schematic process shown in FIG. 1. The bipolar stack 12 is comprised of electrode segments 14 having a lithium ion permeable membrane 16 placed between the electrodes. The anode grids 18 of the cells are secured at the top 20 of the electrode stack 12. The anode terminal 22 is placed on top of the anode segments 18. While not shown in FIG. 1, the cathode segments are secured at the bottom 24 of the battery stack. The cathode grids are bound together at the bottom of the electrode stack and sit within groove 26 shown in FIG. 1. The groove 26 is at the base of the metallic housing 32. The electrode stack 12 has front section 34 and back sections. It also has side sections 38 and 40. After the battery including the electrode stack is assembled, it is then placed within the housing 32. A port for the insertion of electrolyte into the battery stack is prepared. The port is comprised of threaded member 44 into which is inserted a threaded one-way valve 46. A hole 48 is placed within the anode terminal cover 54. A sealer 50 is placed on top of the anode flat portion 52. The sealer or gasket 50 electrolytically seals the top and isolates the anode terminal from the rest of the metallic housing which is cathodically oriented. Due to the porous nature of the top 20 of the battery stack, the electrolyte readily passes through the top 20 into the battery stack and between the electrodes.

The overall processing and assembling of the lithium ion battery of FIG. 1 can be described as follows:

Stage A: assembly of the electrode stack;

Stage B: securing of the anode grids and the anode terminal and cathode grids and cathode terminal;

Stage C: assembly of the anode top portion, with the gasket/sealer and insertion of port and placement of battery including the electrode stack into metallic housing;

Stage D: securing of the top lip portion 53 of the housing 32 by crimping the lip portion to the anode flat portion 52; and ultrasonic welding of the anode top portion 54 to the anode cell terminal 22 as shown by weld 56 using commercially available equipment, such as Condor ST 30 (trademark of Stapla Corporation).

The features of this design includes the final outside ultrasonic weld and crimping at both ends of the cell housing from the outside. This feature creates a low resistance connection between the electrode stack and cell terminals which is desirous for power batteries. The feature also adds crush and crash worthiness to the product. It also minimizes wasted space when the crimping occurs thereby sealing the housing.

The separator gasket/seal 50 is attached to the anode cell end cap which is not rolled into the crimp thereby decreasing possible leaks. The separator gasket/seal acts as a seal and an electrical insulator between the housing parts and between the electrode stack and housing parts. Further, the crimp and the malleable metallic components create a crush and crashworthy package. Due to the design, there is good current distribution across the active material and out to the cell terminal. The housing can be considered a 5 sided can with the grids crimped into the extended troughs 26 and 54 which gives excellent volumetric efficiency.

The housing can is preferably metallic and even more preferably is made of aluminum or stainless steel. The use of aluminum results in a weight savings over other metallic elements. Since only one end of the housing, namely the anode end 54, allows for an improvement of efficiency over both ends being crimped when the cells are positioned side to side.

The electrode stack 12 is comprised of bipolar electrodes 14 with lithium ion permeable membrane 16 between the different cells. While a wide variety of materials can be utilized for the bipolar cells and the ion permeable membrane, one type of cathode could be a lithium metal oxide such as lithium manganese or lithium cobalt oxide. The anode may be a carbon plastic film with a copper current collector. The bipolar electrodes utilize a stable substrate on which is deposited a lithium ion material. The substrate for the lithium cathode can be a material that is stable in the environment of lithium ion cells having a thickness of less than 100 mils. A wide variety of thin film plastic substrates may be utilized, such as polyvinylidene difluoride (PVDF). The separators 16 likewise can be a wide variety of thin film plastic materials having a thickness of less than 100 mils. One material is Mylar (trademark of DuPont for a polyester film).

The electrode stack 12 may also have top section 20 comprised of an electrolyte permeable material, such as a porous carbonaceous or graphite material commercially available.

While the forms of the invention herein disclosed constitute presently preferred embodiments, many others are possible. It is not intended herein to mention all of the possible equivalent forms or ramifications of the invention; it is understood that the terms used herein are merely descriptive rather than limiting and that various changes may be made without departing from the spirit or scope of the invention.

What is claimed is:

1. A substantially sealed lightweight lithium ion battery and container comprising:

a metallic housing having front and back segments, which segments are substantially equal in length and width and a pair of sides having a length substantially equal to the length of the front and back segments;

a lithium ion battery comprised of a stack of lithium ion electrodes sized to fit snuggly within the housing which battery has bipolar electrodes with an electrolyte there between;

a housing bottom member sized to snuggly fit the cathode terminal of the lithium ion electrode stack therein;

a housing top member sized to snuggly fit the anode terminal of the lithium ion electrode stack therein; and an insulated gasket spaced between the anode and the metallic housing electrically separating the anode from the housing.

2. The battery and housing of claim 1 wherein the housing has a port for insertion of electrolyte therein.

3. The battery and housing of claim 1 wherein the housing has a vent for gas release therefrom.

4. The battery and housing of claim 1 wherein the housing top member is sealed to the anode of the lithium battery.

5. The battery and housing of claim 4 wherein the housing top member is ultrasonically sealed to the anode of the lithium battery.

6. The battery and housing of claim 1 wherein the housing bottom member is sealed to the cathode of the lithium battery.

7. The battery and housing of claim 6 wherein the housing bottom member is ultrasonically sealed to the cathode of the lithium battery.

8. The battery and housing of claim 1 wherein the top member is crimp sealed to the battery housing.

9. The battery and housing of claim 1 wherein the housing is comprised of aluminum.

10. The battery and housing of claim 1 wherein the anode terminal is comprised of copper.

11. The battery and housing of claim 1 wherein the sides are substantially rectangular in shape where the width is less than the width of the front and back segments.

* * * * *